United States Patent [19]

Stähle

[11] 4,224,963
[45] Sep. 30, 1980

[54] FLOW-CONTROL VALVE

[75] Inventor: Kurt Stähle, Neuhausen-Steinegg, Fed. Rep. of Germany

[73] Assignee: Concordia Fluidtechnik GmbH, Fed. Rep. of Germany

[21] Appl. No.: 890,309

[22] Filed: Mar. 27, 1978

[30] Foreign Application Priority Data

Apr. 22, 1977 [DE] Fed. Rep. of Germany ....... 2717840

[51] Int. Cl.³ ............................................. F16K 19/00
[52] U.S. Cl. ................................... 137/897; 137/216; 239/428.5
[58] Field of Search ............................. 137/216, 604; 239/419.5, 428.5; 251/331

[56] References Cited

U.S. PATENT DOCUMENTS

| 46,727 | 3/1865 | Strater | 137/604 |
|---|---|---|---|
| 3,273,866 | 9/1966 | Lancy | 137/216 X |
| 3,415,275 | 12/1968 | Berggren | 251/331 X |
| 3,646,607 | 2/1972 | Dower | 137/604 |

FOREIGN PATENT DOCUMENTS

| 60490 | 12/1942 | Denmark | 137/216 |
|---|---|---|---|
| 2021715 | 11/1971 | Fed. Rep. of Germany | 239/428.5 |
| 910694 | 11/1962 | United Kingdom | 137/216 |

Primary Examiner—Robert G. Nilson
Attorney, Agent, or Firm—Craig & Antonelli

[57] ABSTRACT

A flow-control valve is provided, especially for controlling the flow of water heated to near its boiling point. In order to limit cavitation at the position immediately downstream of the throttling point formed by the sealing body, preferably in the form of a rubber diaphragm, and the valve seat, a ventilating slit is provided for communicating ambient air into the flow of liquid at a position downstream of the throttling point. In particularly preferred embodiments, the ventilating slit is formed between a thin inner tube and an outer tube, which outer tube has an upper end forming the valve seat. In particularly preferred embodiments, the cross section for the flow at the position where the ventilating air is introduced, is smaller than the throttling point cross section.

19 Claims, 4 Drawing Figures

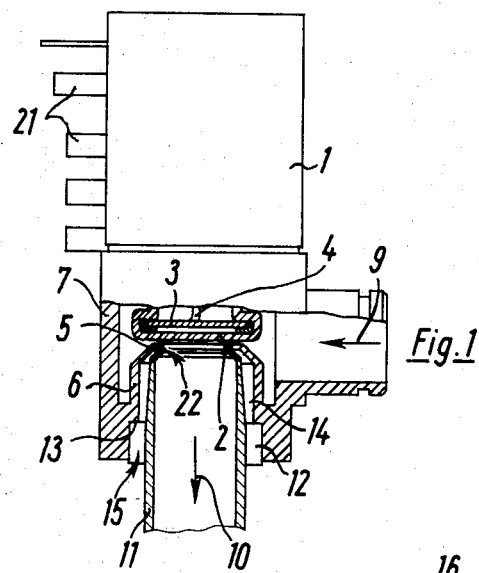
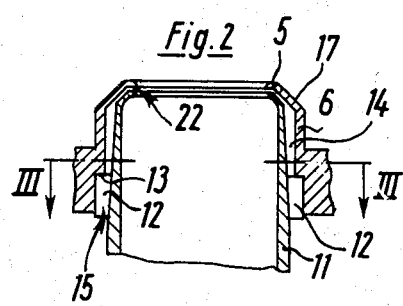
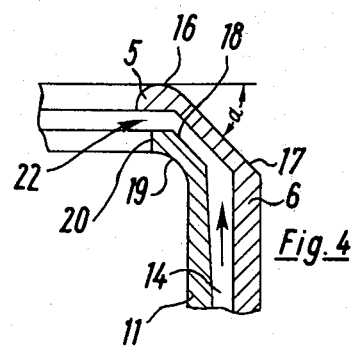
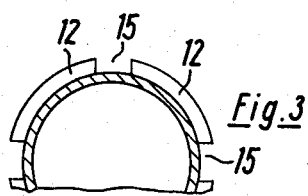

FLOW-CONTROL VALVE

BACKGROUND AND SUMMARY OF THE INVENTION

The invention relates to a flow-control valve for liquids, primarily liquids with temperatures in the vicinity of their boiling points, particularly for water heaters, consisting of a seal cooperating with a valve seat, which with the valve seat forms a throttle point.

Control valves which control the quantity of a given throughput are known. Valves of this type are also sometimes used to control liquids whose temperatures are in the vicinity of their boiling points. It is known, for example, that in water heaters, in particular coffee markers, valves must be installed through which boiling water flows. The problem then arises that depositions of lime must be prevented in order to maintain the function of the valve itself and hence the tight seal. Valves have been proposed for this purpose which have rubber membranes as seals, and these have the advantage that they are set vibrating every time they seal thus clearing away any lime automatically.

However, deposits of lime also have the disadvantage of altering the throughput by increasing the flow resistance. It has been shown, however, when the flow of boiling water is controlled, that at the narrowest flow cross section, which is generally the throttle point between the valve seat and the valve body, after the point where the flow passes over an edge or encounters a resistance, negative pressure occurs resulting in cavitation which can sometimes lead to considerable distortion of the flow. At the same time, at the points where this cavitation occurs, the undesirable deposition of lime occurs relatively rapidly and this in its turn encourages cavitation. Thus a purpose of the present invention is to design a flow-control valve of the type indicated at the outset which will prevent the occurrence of cavitation at the throttle point and hence also prevent lime deposition.

The invention contemplates providing ventilating holes at the throttle point downstream of the narrowest flow cross section. This arrangement counteracts negative pressure formation in the region of the throttle point because the ventilating holes naturally equalize the pressure. Uncontrolled formation of steam bubbles with their effect on the flow can be avoided.

It is advantageous for the ventilating holes to be shaped into an annular slit surrounding the throttle point with the ambient pressure acting on the slit via an annular chamber. Also it is structurally very simple to place the annular slit and the annular chamber between one of the inlet nozzles on which the valve seat is mounted and an inner tube inserted into the latter. In this way difficulties of production technology are avoided.

A particularly advantageous embodiment arises when the inlet nozzle flares conically outward away from the valve seat, because in this case the narrowest cross section is ahead of a flow cross section which can be kept substantially larger. In this way, the upper edge of the inlet nozzle can be formed directly as a valve seat and the end of the inner tube adjacent to the valve seat can be tapered conically upward at an angle which is as large as that of the inlet nozzle. This produces a nozzle-shaped structure at the valve seat through which the flow passes in the opposite direction. This has the great advantage that an annular zone can form downstream of the narrowest cross section which serves to equalize the pressure and prevent cavitation and in which any lime deposited at the edge has no effect on the magnitude of flow. There is an advantageous secondary effect that the equalization air or the colder air column flowing into the annular chamber in the opposite direction to the hot water can cause the inner tube to cool down relatively rapidly after the device is shut off, and this cooling action, if the material is suitably chosen, causes shape changes in the very thin inner tube caused by temperature fluctuations, and any lime deposits can easily flake away. A further advantage is that after the valve seat has closed, outflow from the inner tube is facilitated because the air does not have to flow from the bottom to the top through the liquid which is flowing downward, but can penetrate through the annular slit beforehand from the top. Hence the new valve allows the water to flow away from more rapidly than known valve designs. The inner wall of the conical part of the inner tube advantageously has a diameter somewhat greater than the diameter of the narrowest throttle cross section at the valve seat of the inlet nozzle, since it has been shown that direct impact of the stream of fluid flowing in through the valve against the upper edge of the inner tube and penetration of the fluid into the annular chamber is avoided.

These and further objects, features and advantages of the present invention will become more obvious from the following description when taken in connection with the accompanying drawings which show, for purposes of illustration only, a single embodiment in accordance with the present invention.

BRIEF DESCRIPTION OF THE DRAWINGS

FIG. 1 is a side partial cross sectional schematic view through a new flow-control valve designed as a solenoid valve in accordance with the present invention;

FIG. 2 is an enlarged partial view which shows an inlet nozzle with the valve seat and the inner tube according to the present invention;

FIG. 3 is a cross sectional view through the inner tube of the inlet nozzle along line III—III; and FIG. 4 shows, on an even larger sacle, the design of the valve and of the upper edge of the inner tube which, together with the valve seat forms the annular groove for ventilating the narrowest cross section.

DETAILED DESCRIPTION OF THE DRAWINGS

FIG. 1 shows a solenoid valve whose magnet part actuates a membrane 2 via a plunger in a manner not shown, since such constructions should be readily understood by those skilled in the art of the invention. However, my copending application Ser. No. 847,810, filed Nov. 2, 1971 is referred to and incorporated herein by reference thereto, as an aid in understanding certain details of the present invention. Membrane 2 is stretched by a wire ring 3 which is attached to the plunger by a connecting element 4. Membrane 2 acts as the valve body and cooperates with a valve seat 5, which forms the upper edge of an inlet nozzle 6, which is made integral with valve housing 7, made preferably of plastic. The fluid medium to be controlled, in this case boiling water, flows in the direction of arrow 9 into valve housing 7 and leaves this housing in the direction of arrow 10 when the membrane is lifted off seat 5.

An inner tube 11 is inserted in inlet nozzle 6 which tube abuts with lugs 12 against a stop 13 in housing 7 which stop is located in inlet nozzle 6. Inner tube 11 is held firmly in position in this manner. An annular space 14 is provided between inlet nozzle 6 and inner tube 11 which space communicates with the ambient air via slits 15.

At their upper ends both inlet nozzle 6 and inner tube 11 are tapered conically inward so that the nozzle-like shape results in the fluid passing through them in a direction opposite to that in a nozzle. As shown in detail in FIGS. 2 to 4, the upper edge 16 a valve seat 5 is rounded and is followed by a conical part 17 which flares outward and downward at an angle $\alpha$ of 45° and is followed by a cylindrical part. Inner tube 11 is provided with a conical part 18 which has the same angle $\alpha$ and its inner side forms a rounded annular part 19 which also connects with a cylindrical tubular part. Upper inner edge 20 of inner tube 11 has a diameter which is somewhat larger than the inside diameter at the valve seat so that when membrane 2 opens, the penetrating stream of liquid cannot strike the edge of the inner tube 11.

If membrane 2 moves from the position shown in FIG. 1 to the open position when the solenoid is energized, said solenoid being connected to the electrical control wires by push-on terminals 21, liquid flows from the inner space of valve housing 7 via valve seat 5 into inner tube 11 and flows away in the direction 10. As a result the pressure is equalized by annular slit 22 with the ambient air (pressure) in annular space 14 in the zone of the narrowest cross section, namely valve seat 5, so that negative pressure formation downstream of valve seat 5 is reliably counteracted. Hence the boiling water flowing through cannot be subjected to cavitation phenomena by local negative pressure formation. A pressure equalization zone will form within annular wall part 19. Even if lime is deposited on this wall part, it will have no effect on the flow since it will not appear at the narrowest cross section. The design according to the invention ensures a constant flow even of liquids near their boiling points because cavitation phenomena are prevented. On the other hand, the new valve is particularly suitable for controlling boiling water because, since cavitation has been prevented, lime deposits cannot have such harmful effects as with valves of the usual type; what is more, they can only form in places where they can have no negative effects on flow.

The new valve also has the advantage that inner tube 11 can be made very thin, of suitable material. This thin inner tube 11 is therefore subjected to strong temperature fluctuations every time the machine is turned on and off and, because of thermal expansion, these thermal expansion and contraction movements will break away any lime deposits that might have formed. The new valve is thus particularly suitable for controlling the flow of boiling water. In addition, the design of the valve body as a stretched rubber membrane 2 counteracts lime formation at the valve seat because the membrane is subjected to elastic deformations whenever it is actuated and these automatically remove the lime deposits.

While I have shown and described one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. Flow control valve for liquids, such as water or the like heated to near the boiling point; comprising:
    a sealing body,
    a valve seat which cooperates with the sealing body to form a throttling point,
    and ventilating aperture means opening into the flow of liquid through said valve at a position downstream of the throttling point, said ventilating aperture means being disposed adjacent the throttling point and being configured to prevent cavitation at the throttling point,
    wherein the valve seat is formed on a nozzle which is configured to have an increasing flow cross-sectional area downstream of the throttling point, and wherein the ventilating aperture means open into said nozzle at locations outside of the projection of the throttle point cross-section such that said liquid does not impinge directly on the ventilating aperture means.

2. Flow-control valve according to claim 1, wherein the ventilating aperture means are in the form of an annular slit adjacent the throttling point.

3. Flow-control valve according to claim 2, wherein the ambient pressure acts on the annular slit via an annular chamber.

4. Flow-control valve according to claim 3, wherein the valve seat constitutes part of a flat valve with a membrane fitting flush on a projecting valve seat collar.

5. Flow-control valve according to claim 1, wherein the valve seat constitutes part of a flat valve with a membrane fitting flush on a projecting valve seat collar.

6. Flow-control valve according to claim 5, wherein the edge of the valve seat facing the membrane is rounded.

7. Flow-control valve for liquids, such as water or the like heated or near the boiling point; comprising:
    a sealing body,
    a valve seat which cooperates with the sealing body to form a throttling point, and
    ventilating aperture means opening into the flow of liquid through said valve at a position downstream of the throttling point, said ventilating aperture means being disposed adjacent the throttling point and being configured to prevent cavitation at the throttling point,
    wherein the ventilating aperture means are in the form of an annular slit adjacent the throttle point,
    wherein the ambient pressure acts on the annular slit via an annular chamber, and
    wherein the annular slit and the annular chamber are located between a nozzle supporting the valve seat and an inner tube inserted into said nozzle.

8. Flow-control valve according to claim 7, wherein the nozzle is provided with a conical part which flares conically outward from the valve seat in the flow direction.

9. Flow-control valve according to claim 8, wherein the upper edge of the nozzle is designed as a valve seat.

10. Flow-control valve according to claim 9, wherein the end of the inner tube adjacent to the valve seat is also provided with a conical part.

11. Flow-control valve according to claim 10, wherein the conical part of the inner tube has the same angle $\alpha$ as the conical part of the nozzle.

12. Flow-control valve according to claim 11, wherein the inner edge of the conical part of the inner tube has a diameter which is somewhat larger than the diameter of the narrowest throttle cross section at the valve seat.

13. Flow-control valve according to claim 12, wherein the inner shape of the conical part of the inner tube is rounded toward the inner edge.

14. Flow-control valve according to claim 13, wherein the valve seat constitutes part of a flat valve with a membrane fitting flush on the projecting valve seat collar.

15. Flow-control valve according to claim 14, wherein the edge of the valve seat facing the membrane is rounded.

16. Flow-control valve according to claim 8, wherein the end of the inner tube adjacent to the valve seat is also provided with a conical part.

17. Flow-control valve according to claim 16, wherein the conical part of the inner tube has the same angle $\alpha$ as the conical part of the nozzle.

18. Flow-control valve according to claim 17, wherein the inner edge of the conical part of the inner tube has a diameter which is somewhat larger than the diameter of the narrowest throttle cross section at the valve seat.

19. Flow-control valve according to claim 18, wherein the inner shape of the conical part of the inner tube is rounded toward the inner edge.

* * * * *